United States Patent [19]

Hasegawa

[11] 4,393,760
[45] Jul. 19, 1983

[54] JUICER

[76] Inventor: Tokuichiro Hasegawa, No. 18-6, 5-chome, Kanayama, Naka-ku, Nagoya-shi, Aichi-ken, Japan

[21] Appl. No.: 261,387

[22] Filed: May 7, 1981

Related U.S. Application Data

[63] Continuation of Ser. No. 137,445, Apr. 4, 1980, abandoned.

[30] Foreign Application Priority Data

Apr. 12, 1979 [JP] Japan ............................ 54-47599[U]

[51] Int. Cl.³ ............................................. A23N 1/02
[52] U.S. Cl. ........................................ 99/510; 99/495; 100/117; 100/145

[58] Field of Search ................. 99/495, 509, 510, 511, 99/512, 513; 241/260.1, 260; 100/98 R, 117, 213, 145; 425/207-209

[56] References Cited

U.S. PATENT DOCUMENTS

| 241,024 | 5/1881 | Kieser | 100/98 R |
| 490,802 | 1/1893 | Dunham et al. | 100/98 R |
| 3,126,818 | 3/1964 | Koelsch | 99/513 |
| 4,106,401 | 8/1978 | Ackert | 99/508 |

Primary Examiner—Philip R. Coe
Assistant Examiner—Timothy F. Simone
Attorney, Agent, or Firm—Moonray Kojima

[57] ABSTRACT

A roll to be rotatably inserted within a juicer housing is formed in a brimmed spiral at an upper part thereof and in a coiled spiral at a lower part thereof, whereby raw juice is instantly made by a simplified mechanism and an easy operation.

12 Claims, 10 Drawing Figures

JUICER

This is a continuation of application Ser. No. 137,445 filed Apr. 4, 1980, abandoned.

BACKGROUND OF THE INVENTION

Manual or electrical juicers are known for making raw juice of fruits, vegitables and others. These juicers are complicated in structure, and therefore only those skilled carry out disassemblings, washing and setting up after use. In addition, production cost is inevitably high owing to the complicated structure.

In view of these actual problems, the present invention has been proposed. It is an object of the invention to provide a juicer which instantaneously crushes and squeezes the raw substances to produce the fruit juice without oxidation.

It is another object of the invention to provide a juicer which is made very compact in the structures of a juicer housing and a roll, especially simplified in a filtering part, so that it is possible to make easy and cheap production.

It is a further object of the invention to provide a juicer which is made compact in the structure, thereby to enable easy disassembling, washing and setting up.

DETAILED DESCRIPTION OF PREFERRED EMBODIMENT

Figure 1:
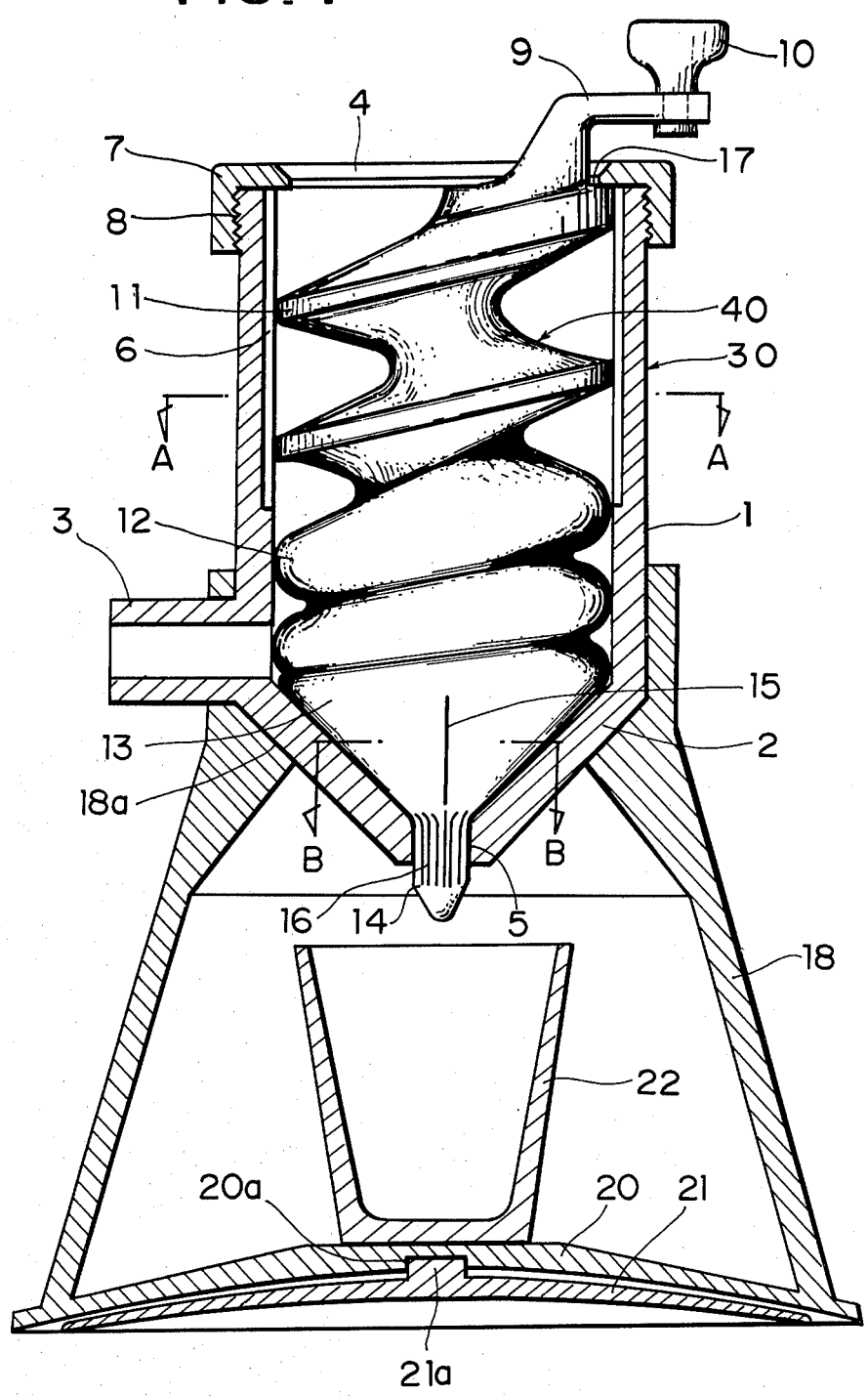
FIG. 1 is a front cross sectional view showing one embodiment according to the invention.

Reference will be made to an embodiment of the invention with the attaching drawings. The numeral 30 in FIGS. 1 and 2 designates a juicer housing, 40 shows a roll which is rotatably arranged in the juicer housing. The juicer housing is formed in cylindrical shape at a body, and in conical shape at a lower part, and is projected with an exhaust port 3 of draffs. The juicer housing 30 opens at a top for a material-supplying mouth 4, and is formed with a hole 5 at a bottom of the conical part 2 for inserting a projection 14 of the roll 40. Further this juicer 30 is integrally formed with a plurality of cutters 6 at a place upper than a center in height of an inner wall of the body 1. This center 6 has as shown in FIG. 3 a saw shape in the horizontal cross section. In this regard, the body 1 is threaded with a screw 8 at its upper outer circumference for engaging a presser link 7.

Figure 4:
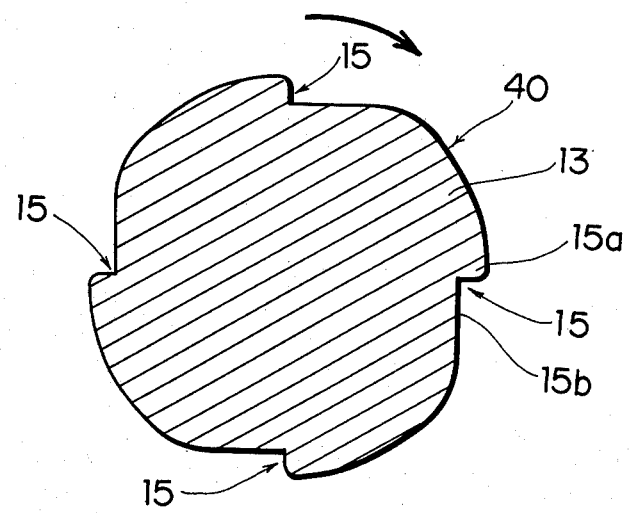
FIG. 4 is a cross sectional view along B—B in FIG. 1.
Figure 5:
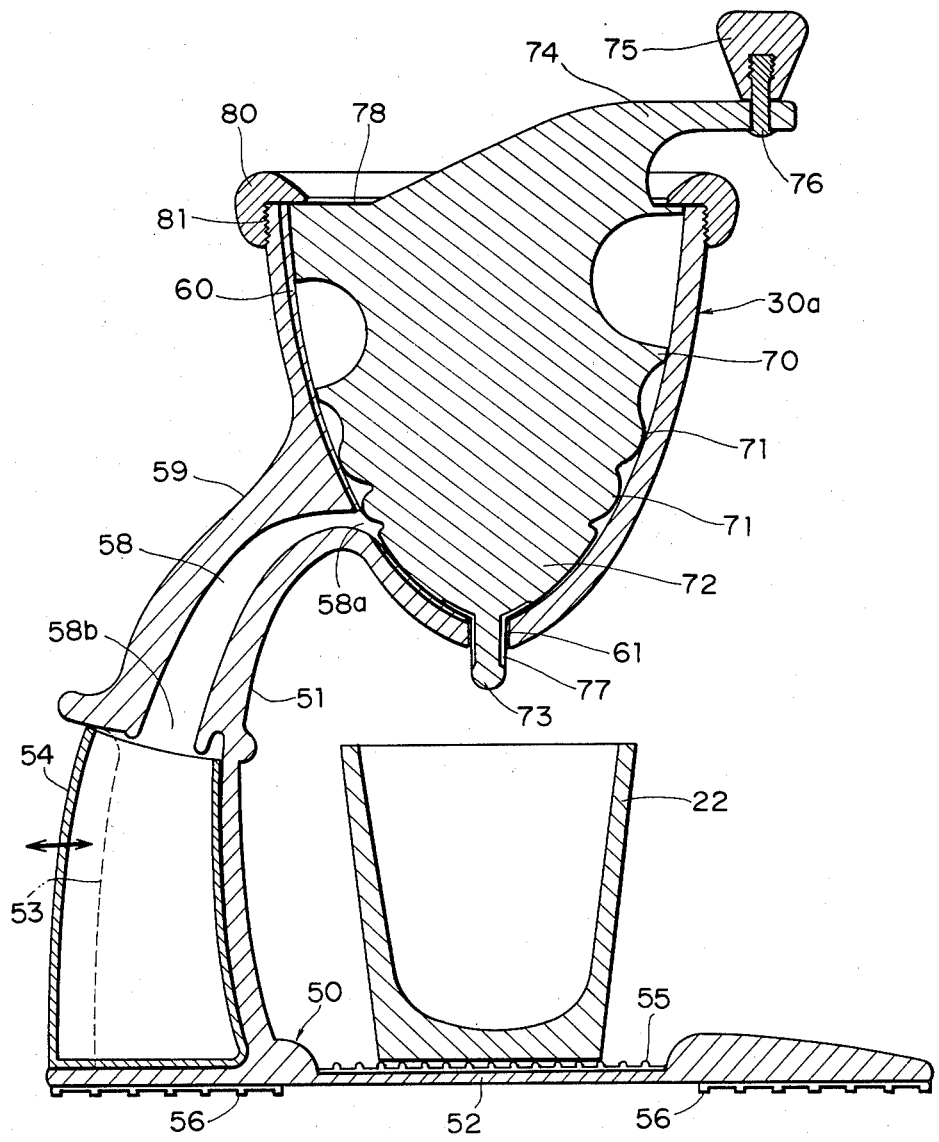
FIG. 5 is a front cross sectional view showing another embodiment according to the invention.
Figure 6:
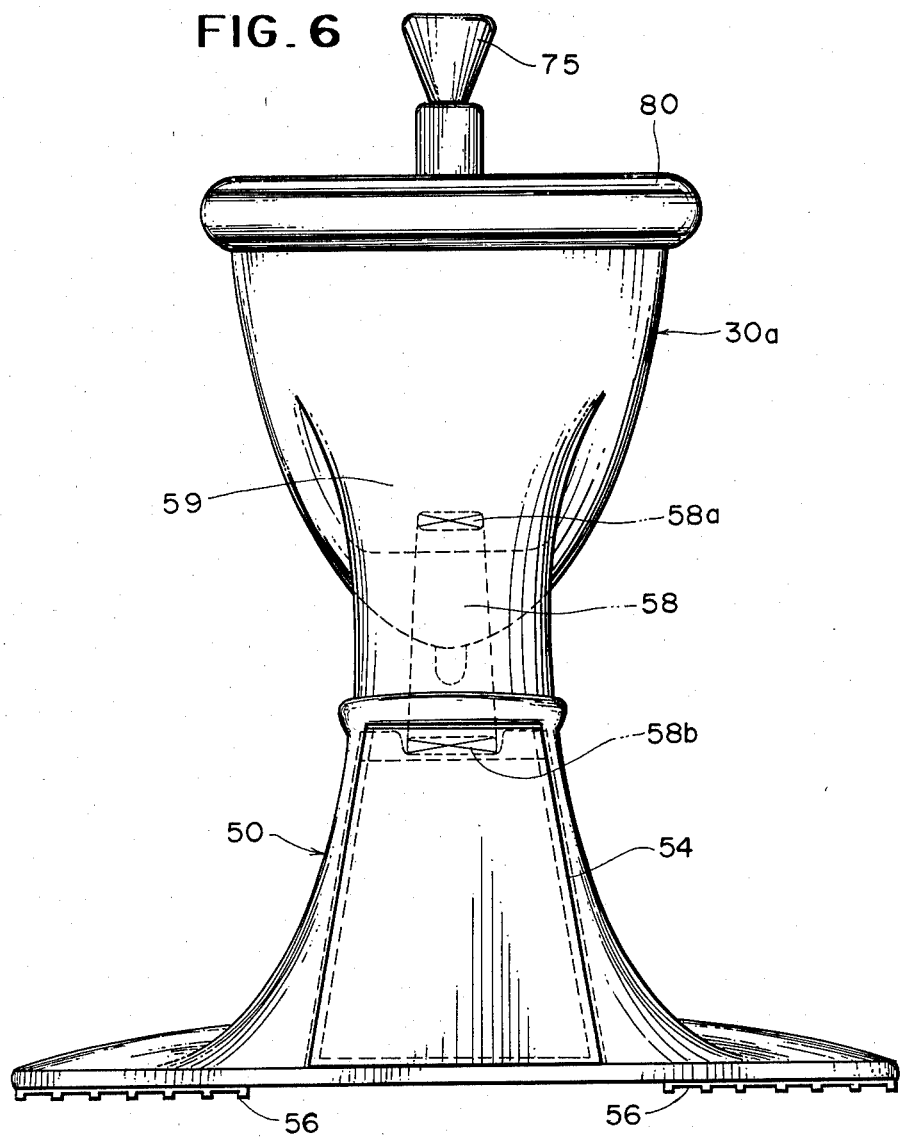
FIG. 6 is a right side view in FIG. 5.

The roll 40 is pivoted with a thumb 10 at a lateral arm 9 which is integrally formed at the upper portion thereof, and a part of the roll corresponding to the cutter 6 is shaped with a brimmed spiral 11 and a lower part thereof is shaped with a coiled spiral 12, and a bottom part 13 corresponding to the conical part 2 of the juicer 30 is almost conical and its lowermost part is formed with a projection 14. The conical part 13 has as shown in FIG. 4 a plurality of steps 15 in the outer circumference, and the projection 14 is formed with a plurality of juice flowing grooves 16 in its outer circumference.

Thus, the roll 40 is arranged within the juicer 30, and the projection 14 is rotatably inserted in the hole 5, and the juicer is screwed at its upper part with the presser link 7 which opens in its center, and a horizontal part 17 of the roll 40 is forced by the circumference of the presser link 7.

Figure 2:
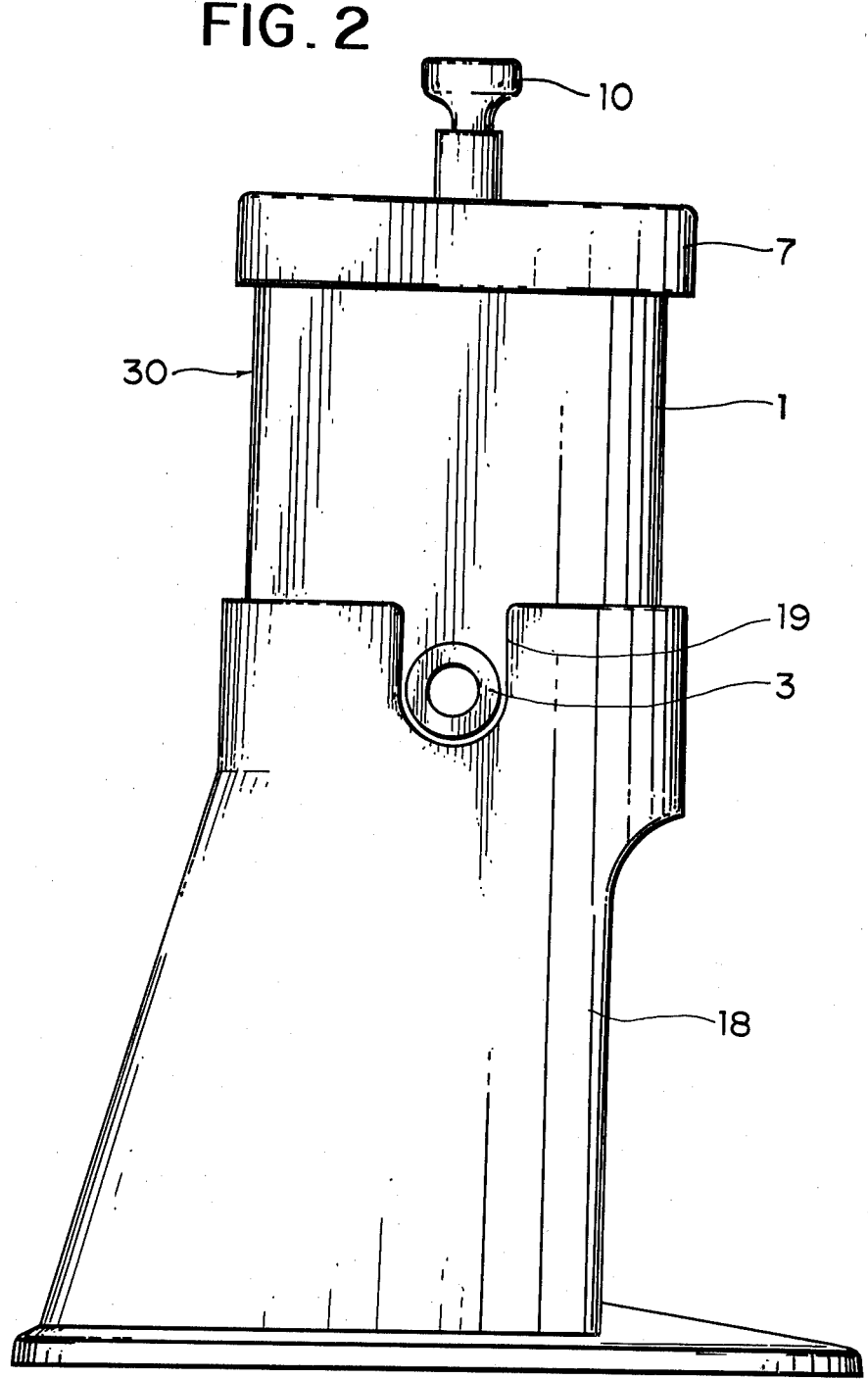
FIG. 2 is a right side view of the above.
Figure 3:
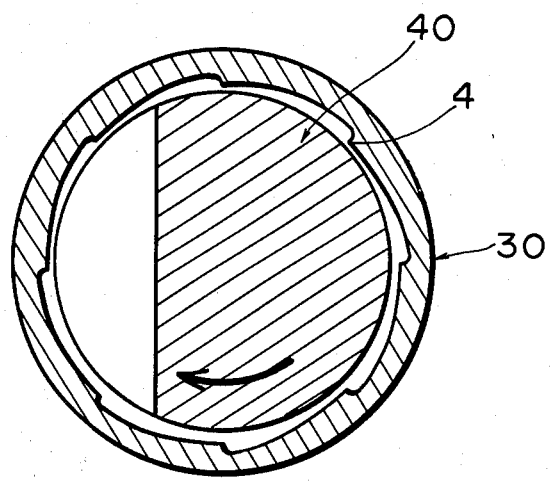
FIG. 3 is a cross sectional view along A—A in FIG. 1.

This juicer is vertically held on a supporter 18 which is cylindrical with a mouth 18b at a front part and is provided with a supporting part 18a for the conical part 2 of the juicer 30, and further is prepared with a cutout 19 as shown in FIG. 2 at a suitable portion of an upper part of the side wall for mounting the exhaust port 3 so that the housing 30 does not follow rotation of the roll 40. The supporter 18 are provided with a cut seat 20 at its bottom and an absorber 21 made of such as rubber. The cup seat 20 is at its bottom formed with a concave 20a into which a convex 21a at a center of the absorber 21 is set.

In the invention, the juicer 30 and the roll 40 are respectively formed with the synthetic resin of hard property. The existing juicer of this kind has been provided with the metallic cutters, however vitamin C in the fruit juice is destroyed if contacting the metal, and so the invention employs the juicer housing 30 and the roll 40 of the synthetic resin including the cutters.

According to the embodiment as mentioned above, the fruits or other materials are supplied through the mouth 4, and when rotating the roll 40 via the thumb 10, the material is fed down through the brimmed spiral 11 and crushed by the cutters 6. The crushed material is urged between the coiled spiral 12 and the cylindrical body 1a to squeeze the fruit juice. The squeezed draff is further squeezed by steps 15a (refer to FIG. 4) of the conical part 13 of the roll 40, followed by raking out upwardly by steps 15b and exhausting it from the port 3. The juice runs along the grooves 16 of the projection 14 and drops into the cup 22, and at this time the groove 16 serves as filter preventing the squeezed draffs from dropping into the cup 22. Since the groove 16 is rotated together with rotation of the roll 40, it is not clogged with the draffs.

FIG. 5 to FIG. 10 show another embodiment of the invention. In the drawings, the numeral 30a designates a juicer housing of the hard synthetic resin, and 40a shows a roll of the hard synthetic resin rotatably inserted in the juicer. The juicer 30a is U-shaped in cross section and is bowl-shaped at a bottom. The juicer of this embodiment is integrally provided with a supporter 50 which comprises a curved supporting part 51 and a bottom 52. The supporting part 51 is provided with a cutout 53 at its lower portion, into which a juice holding cup 54 of transparent plastic is positioned and the cup 54 is laterally moved to be detachably set. The cup 54 is about ¾ within the cutout 53 and is ¼ exposed in a condition that the cut 54 is set in the cutout 53. Within a neck 59 of the supporting part 51 a squeezed draff exhausting path 58 passes and its entering port 58a communicates with the juicer housing 30a. The exhausting path 58 becomes larger in diameter as going down and its exit 58b communicates with the cutout 53. The bottom 52 is covered with slip stoppers 55, 56 at its upper and lower surfaces, and the cup 22 is positioned on the upper slip stopper 55.

Figure 9:
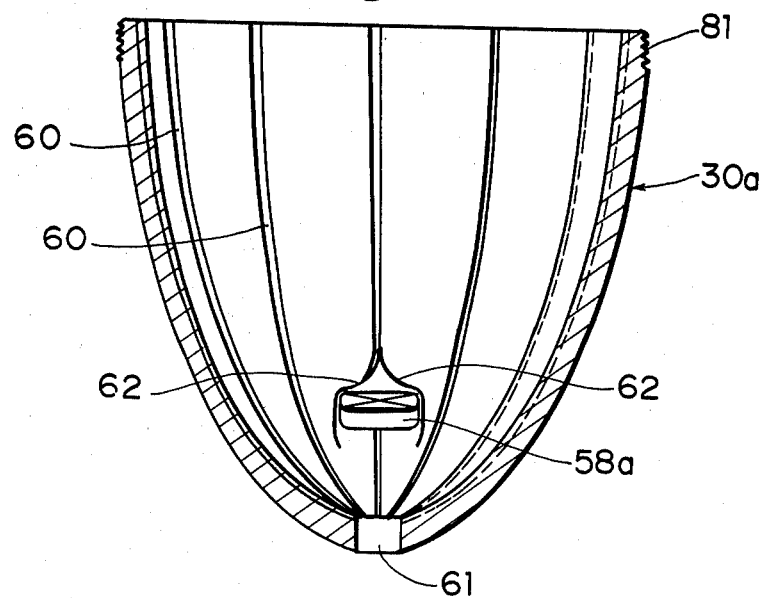
FIG. 9 is a cross sectional view along C—C, removing the roll.
Figure 10:
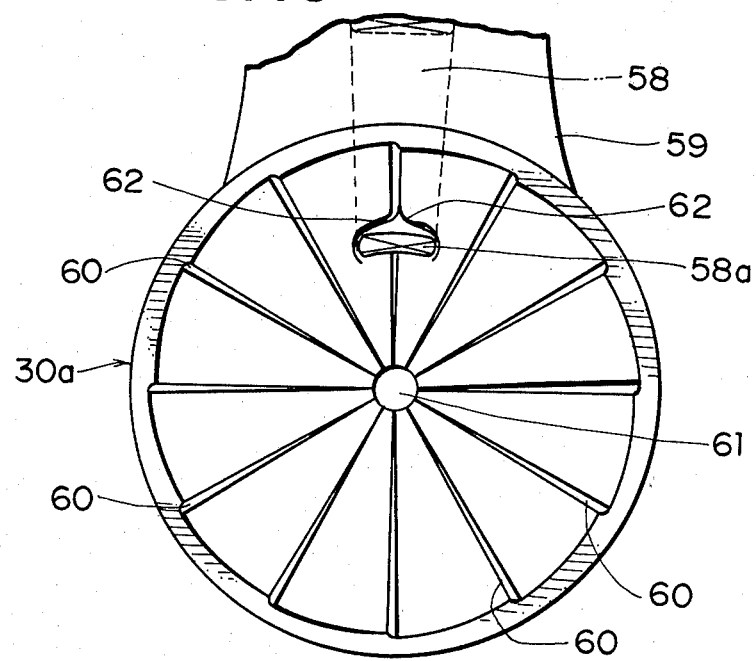
FIG. 10 is a plan view in FIG. 9.

FIG. 9 and FIG. 19 show cutters 60 which is integrally formed on an inner wall of the juicer 30a such that the cutter 60 has saw teeth in the horizontal cross section, the cutter being formed from an upper end of the juicer 30a to a hole 61 for a projection of the roll. The entering port 58a is prepared with a path 62 such that the juice does not soak into the squeezed draffs.

Figure 7:
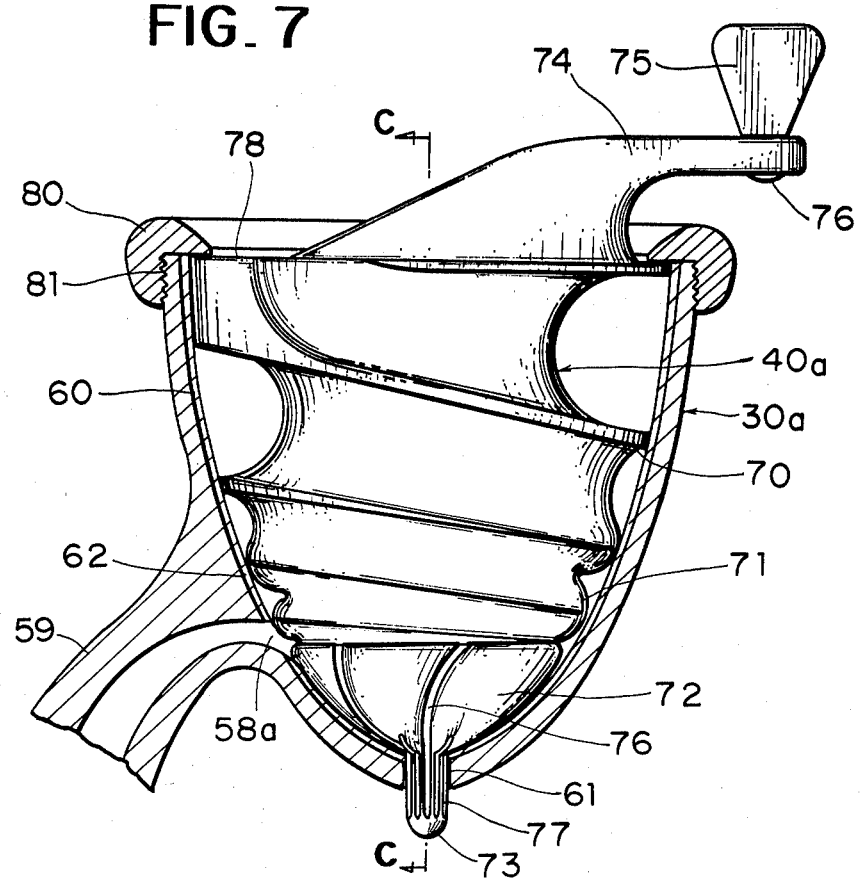
FIG. 7 is a cross section of the juicer housing for showing the roll in FIG. 5.
Figure 8:
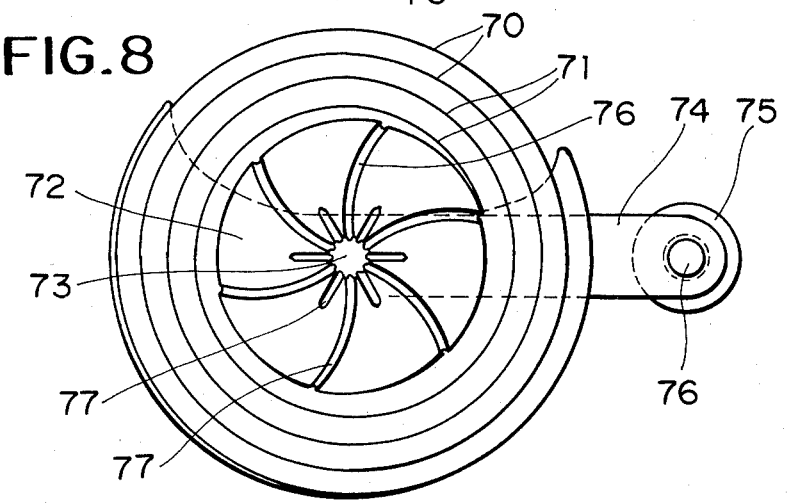
FIG. 8 is a bottom view of the roll shown in FIG. 7.

FIG. 7 and FIG. 8 show in detail the roll 40a employed in this embodiment. The roll 40a is pivoted at its upper lateral arm 74 with a thumb 75 by a shut pin 76, and is formed with a brimmed spiral 70 and with a coiled spiral 71, a lower part of which is a bowled part 72 in correspondence to a bottom of the juicer 30a and a lowermost part part of which is formed with a projection 73. The bowled part 72 is radially formed with a plurality of steps 76 in screw shape, and the projection 73 is provided with vertical grooves 77 which are formed alternately with groove communicating with the step 76 and groove starting from the lower part of the bowled part 72 (refer to FIG. 8). In this embodiment, the entering port 58a is positioned at a border between the bowled part 72 and the coiled spiral 71. The numeral 80 designates a presser link which engages a screw 81 formed at an upper outer circumference of the juicer 30a and engages the circumference of an upper surface 78 of the roll 40a.

According to this embodiment, since it is possible to provide stable operation with one hand holding the device and to yield the squeezed draffs, keeping the hands clean.

Thus, the juicer and the rolls are very easy in structure without requiring the complicated filter. Being integrally constructed, the device is cheap in the production cost. Further, the setting up and the disassembling thereof can be easily performed by attaching and detaching the presser link. Since the raw materials are instantaneously crushed and squeezed without having oxidation, it turns out hygienically the juice of high nutritive qualities.

If the present device is used commercially, an entire body is made large scaled as the cases order, and if a shaft is connected to the center of the roll, it may be used successively.

I claim:

1. A juicer comprising a housing having a top portion with a raw material supplying mouth, a plurality of cutters, a support structure for said housing, a roll for pressing the raw material and a link means engaging the top portion for holding the roll within said housing; wherein said housing has a bowl shaped structure with an exhaust port disposed at an intermediate portion thereof for removal of draff after pressing of said raw material, and further with an opening disposed at the bottom portion thereof for removal of juice produced by said pressing of said raw material;

said plurality of cutters are arranged in vertical length in an inner wall of said housing;

said roll has a convex bowl shape corresponding to the inner shape of said housing and substantially fit within said housing, and further comprising spiral shaped top portion, spiral shaped intermediate portion and a bowl shaped bottom portion, said spirals having their threads running vertically, and said top spiral having a larger space between each thread than the intermediate spiral, said bottom portion including a projection at the bottom thereof, said projection fitting into said opening disposed at the bottom of said housing, and wherein said bottom portion and said projection have a plurality of vertical grooves therein and terminating toward the end of said projection whereby squeezed juice will flow by gravity through said vertical grooves and out of said opening of said housing; and wherein said roll is positioned with the portion between the intermediate spiral and the bottom portion being disposed adjacent said exhaust port, whereby said raw material is fed into said supplying mouth and by operating said roll, said raw material is pressed against said cutters first grossly by the upper spiral and then finely by the intermediate spiral, and then the resulting draff of said raw material is exhausted through said exhaust port and the resulting juice flows through said vertical grooves of said bottom portion and through said vertical grooves of said projection and through said opening at the bottom of said housing.

2. A juicer as claimed in claim 1, wherein the cutters to be arranged within the housing are integrally formed in circumference of an inner wall of the housing such that the cutters have saw teeth in horizontal cross section.

3. A juicer as claimed in claims 1 or 2, wherein the cutters are formed at position in the inner wall of the housing, corresponding to the brimmed spiral of the roll.

4. A juicer as claimed in claim 2, wherein the cutters are formed from the upper part of the inner wall to the hole at the lowest part of the roll.

5. A juicer as claimed in claim 1, wherein the roll is formed with step in circumference of the conical or bowled part of the roll.

6. A juicer as claimed in claim 5, wherein the step is formed in screw shape.

7. A juicer as claimed in claim 1, wherein the lowest projection of the roll is vertically formed in circumference with a plurality of juice flowing grooves.

8. A juicer as claimed in claim 7, wherein the juice flowing groove communicates with the step formed in circumference of the conical or bowled part of the roll.

9. A juicer as claimed in claim 1, wherein the supporter is cylindrical with a mouth at a front part and is provided with a supporting part at its upper part of the inner wall thereof for holding the lower part of the juicer.

10. A juice as claimed in claim 9, wherein the supporter has a cup seat at its bottom and an absorber at a rear side of the cut seat.

11. A juicer as claimed in claim 1, wherein the supporter comprises a supporting part integrally fixed to the side of the housing and a horizontal bottom integrally fixed to the supporting part, and the supporting part is prepared at its neck with a squeezed draff exhaust port and is formed at its lower part with a cutout for setting a draff box.

12. A juicer as claimed in claim 1, wherein the draff exhaust port is provided at a position corresponding to a border between the coiled spiral of the roll and the conical or bowled part thereof.

* * * * *